(No Model.)

L. BUESE & J. COWLING.
ROD COUPLING.

No. 483,896. Patented Oct. 4, 1892.

WITNESSES:
C. Neveux
C. Sedgwick

INVENTORS:
L. Buese
J. Cowling
BY
ATTORNEYS.

UNITED STATES PATENT OFFICE.

LOUIS BUESE AND JOHN COWLING, OF REPUBLIC, MICHIGAN.

ROD-COUPLING.

SPECIFICATION forming part of Letters Patent No. 483,896, dated October 4, 1892.

Application filed June 11, 1892. Serial No. 436,322. (No model.)

*To all whom it may concern:*

Be it known that we, LOUIS BUESE and JOHN COWLING, both of Republic, in the county of Marquette and State of Michigan, have invented a new and improved Rod-Coupling, of which the following is a full, clear, and exact description.

Our invention relates to improvements in that class of couplings which are adapted to connect a swivel-block with a drill-rod, such as is used for drilling or boring; and the object of our invention is to produce an extremely simple and durable coupling, which may be instantly coupled to or uncoupled from the drill-rod, which forms a strong connection, so that the rod may be easily and safely pulled when necessary, and which may be quickly thrown into or out of gear.

To this end our invention consists in a rod-coupling the construction of which will be hereinafter described and claimed.

Reference is to be had to the accompanying drawings, forming a part of this specification, in which similar figures of reference indicate corresponding parts in all the views.

Figure 1:
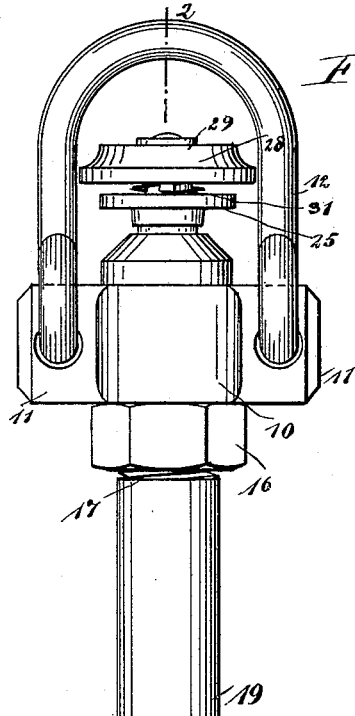
Figure 2:
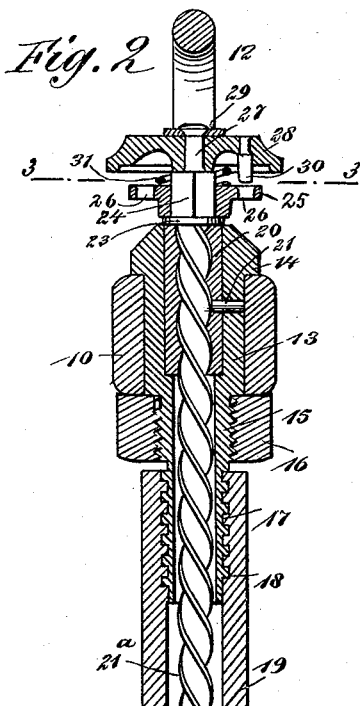
Figure 3:
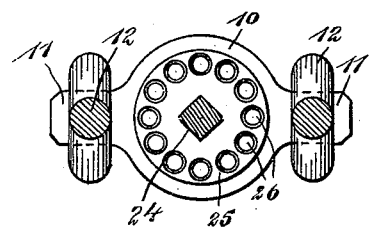

Figure 1 is a side elevation of a coupling as applied to a drill-rod. Fig. 2 is a central longitudinal section on the line 2 2 in Fig. 1, and Fig. 3 is a sectional plan on the line 3 3 in Fig. 2.

The coupling is provided with a suspending-yoke, which has a cylindrical middle portion 10 and diametrically-opposite side lugs 11, to which is secured a swinging bail or clevis 12, and the latter is for the purpose of providing means for attaching a rope or cable, so that when necessary the coupling and its connecting-rod may be pulled. A swivel-plug 13 is journaled in the cylindrical portion of the yoke 10, this plug having a longitudinal bore extending entirely through it and having at its outer end a flange 14, which overlaps the cylindrical portion of the yoke. Immediately below the cylindrical portion of the yoke the plug is screw-threaded, as shown at 15, so as to receive a nut 16, which abuts with the lower edge of the yoke and holds the parts in the correct relative positions.

The lower end of the plug 13 projects down through the nut 16 and is provided with a heavy thread 17, preferably of rectangular cross-section, which engages a similar threaded portion 18 on the interior and upper end of a drill-rod 19, which is of the common kind and adapted to carry a drill at its lower end or to connect with a similar rod which carries a drill.

In the upper portion of the plug 13 is held a nut 20, the nut being fastened in position by a pin 21, which extends transversely through the nut and plug, and in this nut is held to turn a long screw $21^a$, which extends downward through the nut, the plug 13, and into the drill-rod 19, the screw having a stop 22 at its lower end, which prevents it from being withdrawn from the nut. Near the top of the screw is a flange 23, which by striking the top of the nut 20 limits the downward movement of the screw. The screw has a square head 24, to which is loosely secured a collar or wheel 25, and the latter has a series of vertical holes 26 arranged around it and near its edge, which are adapted to receive a locking-pin, as described below. The upper extremity of the screw terminates in a cylindrical bearing portion 27, which is formed on the head 24, and on this bearing is journaled a hand-wheel 28, which is held in place by a washer 29, to which the top of the bearing 27 is riveted. On the under side of the hand-wheel is a depending pin 30, which registers with the holes 26, and by pulling up the collar 25 the pin may be made to enter one of the holes. The collar is, however, normally pressed downward by a spiral spring 31, which encircles the screw-head and is arranged between the hand-wheel 28 and the collar.

The operation of the coupling is as follows: When the plug is to be inserted in the end of the rod, the collar 25 is pushed upward against the hand-wheel, so that the pin 30 will enter one of the holes 26 and lock the collar and hand-wheel together. The lower threaded portion 17 of the plug is placed so as to register with the threaded end of the drill-rod 19, and the hand-wheel 28 is then forced downward. This causes the screw $21^a$ and plug 13 to revolve in the yoke 10, and consequently by simply forcing down the screw the plug is screwed firmly into the drill-rod. If the rod is to be pulled, a rope or cable is fastened to the clevis or bail 12 and the whole apparatus turned in the usual way. If the screw in the connection should be a very long one, it will be seen that the screw may be forced downward, as described, and then by removing the pressure from the collar 25 and permitting it to separate from the hand-wheel 28 the latter may be raised, thus lifting the screw without turning the plug, as the bearing 27 will turn loosely in the hand-wheel 28. If, however, the plug is to be uncoupled, the hand-wheel and collar are held together, as described, and pulled upward, thus unscrewing the plug.

Having thus described our invention, we claim as new, and desire to secure by Letters Patent—

1. A rod-coupling comprising a supporting-yoke, a swivel-plug held to turn in the yoke and provided with a threaded lower end, a screw extending longitudinally through the plug and adapted to turn the same, a collar held to turn with the upper end of the screw, a hand-wheel journaled loosely on the screw, and a fastening device to connect the hand-wheel and collar, substantially as described.

2. A rod-coupling comprising a supporting-yoke, a swivel-plug journaled in the yoke and having a longitudinal bore and a threaded lower end, a screw extending longitudinally through the plug and adapted to turn the latter, a collar held to slide on and turn with the screw, said collar having perforations therein, a hand-wheel journaled loosely on the screw near the collar, and a pin secured to the hand-wheel and adapted to register with the holes in the collar, substantially as described.

3. A rod-coupling comprising a supporting-yoke, a swivel-plug held to turn in the yoke and provided with a longitudinal bore and a threaded lower end, a nut secured in the bore of the plug, a screw extending longitudinally through the plug and held to turn in the bore, stops to limit the movement of the screw, a collar held to slide on and turn with the screw, a hand-wheel journaled on the screw adjacent to the collar, and a fastening device to secure the hand-wheel and collar together, substantially as described.

4. A rod-coupling comprising a supporting-yoke provided with a bail, a swivel-plug journaled in the yoke and having a threaded lower end, a nut held within the plug, a screw extending longitudinally through the nut, the screw having stops near its ends and a squared head at its outer end, a perforated collar held to slide on the squared head of the screw, a hand-wheel journaled on the screw above the collar, a pin secured to the hand-wheel and held to register with the perforations in the collar, and a spring to force the collar and hand-wheel apart, substantially as described.

LOUIS BUESE.
JOHN COWLING.

Witnesses:
JOSEPH GLAUDE,
THEOPHILE GARIEPY.